(12) United States Patent
Shimazoe et al.

(10) Patent No.: US 9,093,673 B2
(45) Date of Patent: Jul. 28, 2015

(54) FUEL CELL CONSTITUTING COMPONENT

(75) Inventors: Toshihiro Shimazoe, Kanagawa-Ken (JP); Shigeru Watanabe, Kanagawa-Ken (JP)

(73) Assignee: NOK CORPORATION, Tokyo (JP)

( * ) Notice: Subject to any disclaimer, the term of this patent is extended or adjusted under 35 U.S.C. 154(b) by 411 days.

(21) Appl. No.: 12/853,895

(22) Filed: Aug. 10, 2010

(65) Prior Publication Data

US 2011/0053048 A1 Mar. 3, 2011

(30) Foreign Application Priority Data

Sep. 1, 2009 (JP) .................................. 2009-201806

(51) Int. Cl.
*H01M 8/02* (2006.01)

(52) U.S. Cl.
CPC .......... *H01M 8/0286* (2013.01); *H01M 8/0276* (2013.01); *Y02E 60/50* (2013.01)

(58) Field of Classification Search
CPC ............ H01M 8/0276; H01M 8/0286; H01M 8/0271; H01M 8/0278; Y02E 60/50
USPC ........................... 429/469, 470; 156/290, 291
See application file for complete search history.

(56) References Cited

U.S. PATENT DOCUMENTS

| | | | | |
|---|---|---|---|---|
| 6,080,503 A | * | 6/2000 | Schmid et al. | 429/483 |
| 2006/0035134 A1 | * | 2/2006 | Inoue et al. | 429/35 |

FOREIGN PATENT DOCUMENTS

JP 2006-216400 A 8/2006

OTHER PUBLICATIONS

Machine Translation of JP2004-311254.*

* cited by examiner

*Primary Examiner* — Christopher Schatz
(74) *Attorney, Agent, or Firm* — Harness, Dickey & Pierce, P.L.C.

(57) ABSTRACT

A fuel cell component integrates an attachment member 5 and a gasket 1 by using an adhesive 3. Both side portions of the gasket in the width direction of the gasket are provided with adhesive application regions W1 where the adhesive 3 is interposed, and a center portion in the width direction of the gasket is provided with an adhesive non-application region W2 where the adhesive 3 is not interposed so as to ensure an attachability.

3 Claims, 5 Drawing Sheets

FUEL CELL CONSTITUTING COMPONENT

CROSS-REFERENCE TO RELATED APPLICATIONS

This application claims the benefit and priority of Japanese Application No. P2009-201806, filed Sep. 1, 2009. The entire disclosure of the above application is incorporated herein by reference.

FIELD

The present disclosure relates to a constituting component for a fuel cell.

BACKGROUND

This section provides background information related to the present disclosure which is not necessarily prior art.

A fuel cell generates electricity using a principle of taking electricity during the process of obtaining water from a reaction of hydrogen and oxygen (air). This fuel cell includes a fuel cell stack including a plurality of layers of cells each made up of: an electrolyte membrane letting hydrogen ions pass therethrough; and two separators sandwiching the electrolyte membrane therebetween. The separators forming a cell are required to have a sealing property to block hydrogen and oxygen and a conductive property enabling electricity to be taken.

Since hydrogen, oxygen, strong acids, hydrofluoric acids, coolant water and the like are used in the stack, a gasket is incorporated therein so as to seal these substances. The gasket has to deal with such various sealing objects including hydrogen, oxygen, strong acids, hydrofluoric acids and coolant water, and an adhesive also is required to be resistant to these sealing objects.

The gasket has to have durability for a very long time, and the adhesive also is required to keep attachability over a long time period, i.e. to have durable strength. Deterioration in the attachability causes a problem of gasket displacement due to a pressure in the cell, for example.

Meanwhile, as illustrated in FIG. 4, a fuel cell constituting component is known, which is obtained by applying an adhesive 3 on the entire bottom surface of a gasket 1 so as to chemically bond an attachment member 5 such as an impregnation integral molding carbon plate, a metal plate, or a resin film, thus integrating the attachment member 5 and the gasket 1.

As illustrated in FIG. 5, however, when the adhesive 3 is applied on the entire surface, a sealing object S on a stack inside A might enter into an interface between the gasket 1 and the attachment member 5, and cleave chemical bonding between rubber and the adhesive, and such deterioration might diffusively spread so as to attack the continuous adhesive application layer progressively, thus leading to an increasing tendency of deterioration in attachability.

Further, as illustrated in FIG. 6, there is another problem that the adhesive interface undergoes a force similar to stress generated at the bottom surface of the gasket 1 during compression of the gasket 1, so that a load is generated upon bonding the gasket 1 to the adhesive 3. This might lead to not only the deterioration in attachability but also a reason for rupture H of the gasket 1 itself as illustrated in FIG. 7.

SUMMARY

This section provides a general summary of the disclosure, and is not a comprehensive disclosure of its full scope or all of its features.

In view of the above-stated points, it is an object of the present disclosure to provide a fuel cell constituting component with attachability less prone to deterioration and with a load hardly being generated upon bonding a gasket to an adhesive.

In order to cope with the above-stated technical problems, a fuel cell constituting component of the present disclosure is configured as follows. That is, a fuel cell constituting component according to a first aspect of the present disclosure is obtained by integrating an attachment member and a gasket by using an adhesive, wherein both side portions of a gasket formation surface of the attachment member in the width direction of the gasket are provided with adhesive application regions where the adhesive is interposed, and a center portion in the width direction of the gasket is provided with an adhesive non-application region where the adhesive is not interposed.

A fuel cell constituting component according to a second aspect of the present disclosure is obtained by integrating an attachment member and a gasket by using an adhesive, wherein both side portions of a gasket formation surface of the attachment member in the width direction of the gasket are provided with adhesive application regions where the adhesive is interposed, and a center portion in the width direction of the gasket is provided with an adhesive non-application region where the adhesive is not interposed, and in the adhesive non-application region, the attachment member is provided with a protrusion.

A fuel cell constituting component according to a third aspect of the present disclosure is obtained by integrating an attachment member and a gasket by using an adhesive, wherein both side portions of a gasket formation surface of the attachment member in the width direction of the gasket are provided with adhesive application regions where the adhesive is interposed, and a center portion in the width direction of the gasket is provided with an adhesive non-application region where the adhesive is not interposed, and in the adhesive application regions, the attachment member is provided with a groove portion, in which the adhesive is filled.

According to the fuel cell constituting component of the first aspect of the present disclosure, the center portion in the width direction of the gasket, at which a seal surface pressure is generated at the bottom surface of the gasket during compression, is provided with an adhesive non-application region where the adhesive is not interposed. At this time, an adhesive on the stack inside may be influenced by the sealing objects. Whereas, an adhesive on the stack outside is not influenced by the sealing objects, because it is sealed by a seal surface pressure at the bottom surface of the gasket. That is, the fuel cell constituting component is less prone to deterioration in attachability and a load is hardly generated upon bonding the gasket to the adhesive.

The adhesive application region is not continuous, thus making it possible to prevent diffusive deterioration, from which long-lasting durable strength can be expected.

The center portion of the bottom surface of the gasket is not constrained by adhesion, and therefore a shearing force during compression can be alleviated, thus making it possible to prevent rupture of the gasket from the bottom surface.

The fuel cell constituting component of the second aspect of the present disclosure is provided with a protrusion at the center potion of the gasket formation surface and the adhesive is applied at both sides thereof. Thus, in addition to the advantages of the first aspect, the fuel cell constituting component of the second aspect of the present disclosure has an advantage of preventing the adhesive flowing toward the center portion, thus improving reliability of the seal at the rear face (adhesion surface) of the gasket.

The fuel cell constituting component of the third aspect of the present disclosure is provided with the groove portions at both sides of the gas formation surface, into which the adhesive is applied. Thus, in addition to the advantages of the first aspect, the fuel cell constituting component of the third aspect of the present disclosure has an advantage of obtaining a stable adhesion application state.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

The following describes embodiments of the present disclosure with reference to the drawings.

Embodiment 1

Figure 1A:
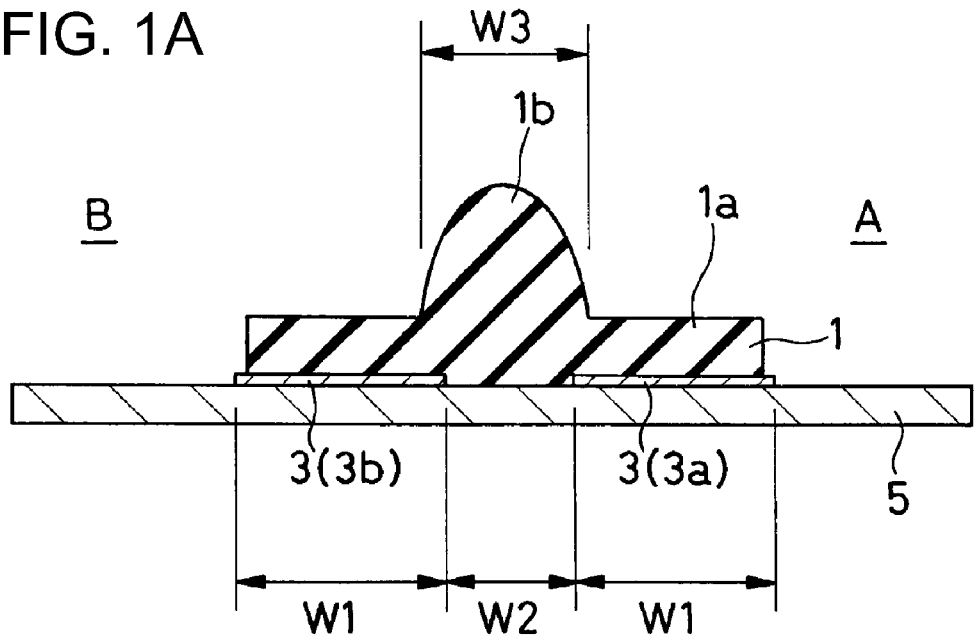
FIG. 1A is a cross-sectional view illustrating major parts of a fuel cell constituting component according to Embodiment 1 of the present disclosure.

As illustrated FIG. 1A, a fuel cell constituting component of the present embodiment is obtained by integrating a gasket 1 and an attachment member 5 using an adhesive 3.

Both side portions of a formation surface for the gasket 1 of the attachment member 5 in the width direction of the gasket are provided with adhesive application regions W1 where the adhesive 3 is interposed, and a center portion in the width direction of the gasket is provided with an adhesive non-application region W2 where the adhesive 3 is not interposed.

The attachment member 5 in the above-stated embodiment may be a separator, for example, that is a sheet-shaped member playing a role to block gas and air. A material thereof may be carbon, metal, resin or the like.

The gasket 1 is provided in an endless manner along a perimeter portion on a flat surface of the attachment member 5, for example, having a cross-section including an inverted U-shaped sealing lip 1b integrally formed with a flat-shaped attachment portion 1a, and a material of the gasket 1 may be an elastic body in the form of rubber. The gasket 1 for fuel cell deals with various sealing objects such as hydrogen, oxygen, strong acids, hydrofluoric acids, and coolant water (ethylene glycol).

Since the gasket 1 deals with various sealing objects as stated above, the adhesive 3 also is required to be resistant to these sealing objects. Further, the gasket has to have durability for a very long time, and the adhesive 3 is similarly required to have long-lasting durable strength.

The above-stated fuel cell constituting component can be manufactured, for example, by spraying the adhesive 3 for application or by applying the adhesive 3 using a dispenser to the part of the attachment member 5 to form the gasket 1 thereon, and vulcanization-forming the gasket 1 on the adhesive 3.

The above-stated configuration is just an example, which is not a limiting one.

The thus configured fuel cell constituting component has the following advantages.

The center portion of the bottom surface of the gasket 1 is provided with the adhesive non-application region W2, which is not constrained by adhesion. Therefore a shearing force during compression can be alleviated, thus making it possible to prevent rupture of the gasket 1 from the bottom surface.

At this time, an adhesive 3a on the stack inside A may be influenced by the sealing objects. Whereas, an adhesive 3b on the stack outside B is not influenced by the sealing objects because it is sealed by a seal surface pressure at the bottom surface of the gasket 1.

Further, the adhesive application region W1 is not continuous, thus making it possible to prevent diffusive deterioration.

Figure 1B:
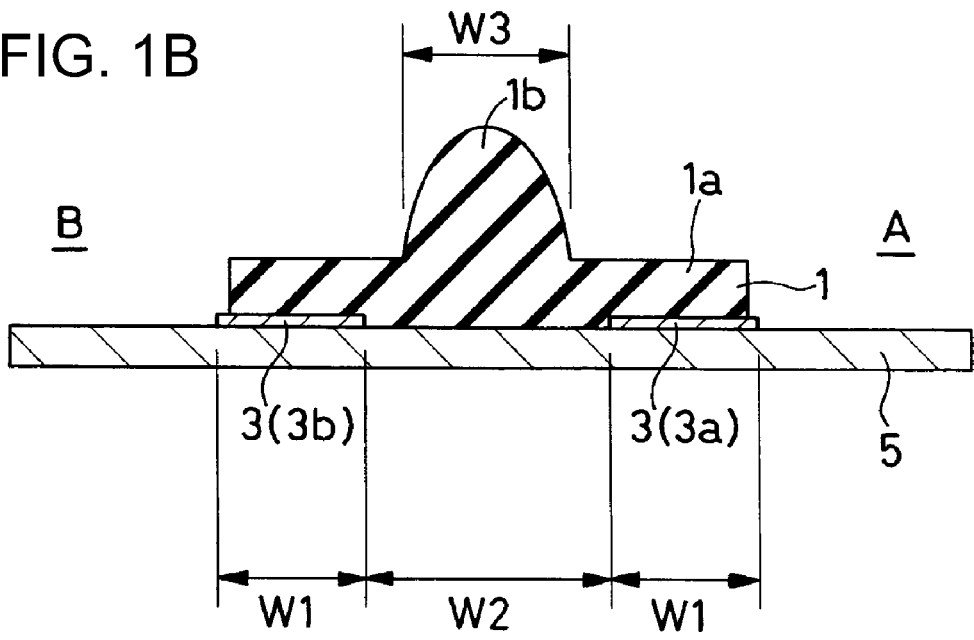
FIG. 1B is a cross-sectional view illustrating the same parts with an increased width of an adhesive non-application region.

As illustrated in FIG. 1B, the width of the adhesive non-application region W2 is configured to be more than the width W3 where the seal surface pressure occurs at the bottom surface of the gasket 1 during compression, thus further preventing deterioration in attachability.

Figure 6:
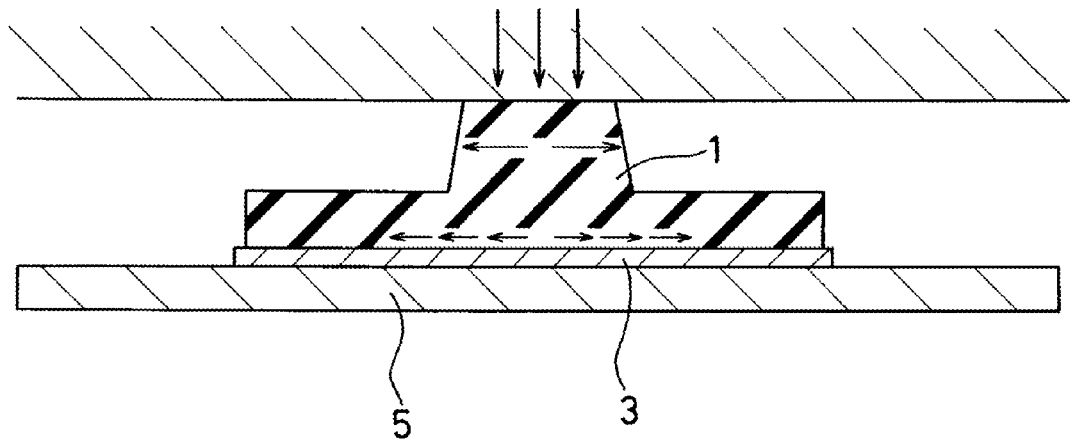
FIG. 6 illustrates a state where a malfunction occurs in the fuel cell constituting component according to the prior art example.
Figure 7:
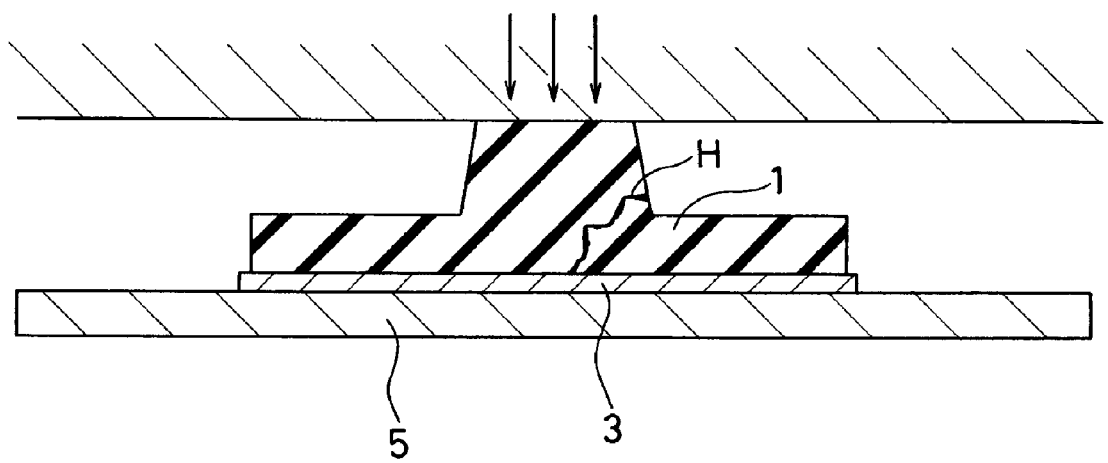
FIG. 7 illustrates a state where a malfunction occurs in the fuel cell constituting component according to the prior art example.

That is to say, the width of the adhesive non-application region W2 is made more than the width W3 where the seal surface pressure occurs at the bottom surface of the gasket 1 during compression, thus further preventing deterioration in attachability due to a phenomenon as in FIG. 6 that illustrates a state where the adhesion interface undergoes a shearing force due to elastic deformation of the gasket 1.

With the above-stated configuration, long-lasting durable strength of the adhesive 3 can be expected.

Embodiment 2

Figure 2A:
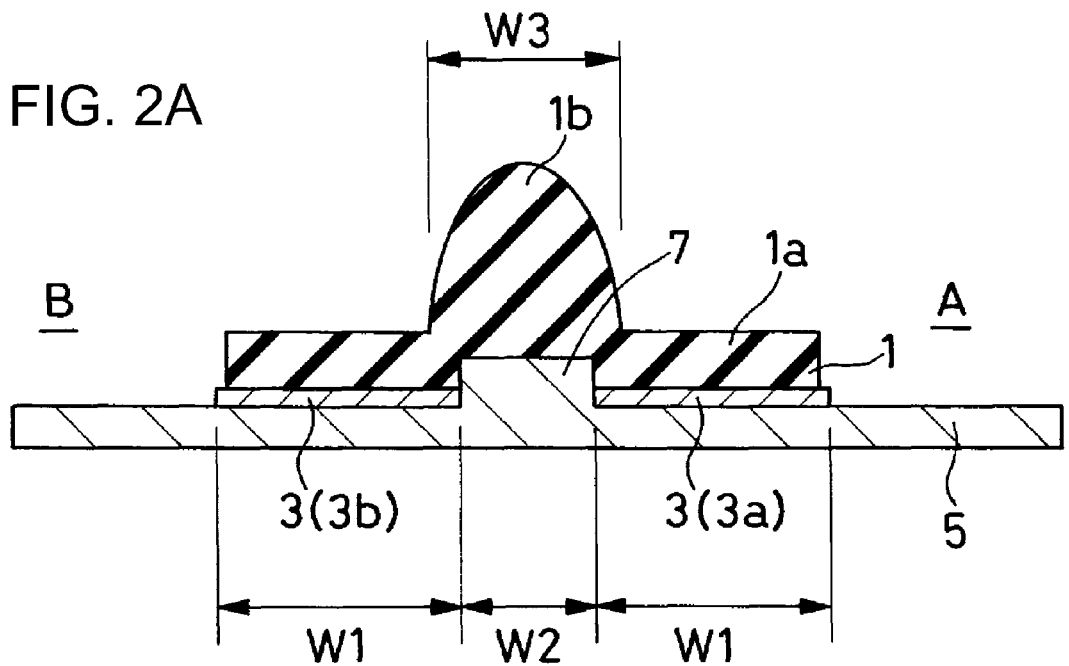
FIG. 2A is a cross-sectional view illustrating major parts of a fuel cell constituting component according to Embodiment 2 of the present disclosure.

As illustrated FIG. 2A, a fuel cell constituting component of the present embodiment is obtained by integrating a gasket 1 and an attachment member 5 using an adhesive 3.

Both side portions of a formation surface for the gasket 1 of the attachment member 5 in the width direction of the gasket are provided with adhesive application regions W1 where the adhesive 3 is interposed, and a center portion in the width direction of the gasket is provided with an adhesive non-application region W2 where the adhesive 3 is not interposed.

Then, in the adhesive non-application region W2, the attachment member is provided with a protrusion 7.

The attachment member 5 in the above-stated embodiment may be a separator, for example, that is a sheet-shaped member playing a role to block gas and air. A material thereof may be carbon, metal, resin or the like.

The gasket 1 is provided in an endless manner along a perimeter portion on a flat surface of the attachment member 5, for example, having a cross-section including an inverted U-shaped sealing lip 1b integrally formed with a flat-shaped attachment portion 1a, and a material of the gasket 1 may be an elastic body in the form of rubber. The gasket 1 for fuel cell deals with various sealing objects such as hydrogen, oxygen, strong acids, hydrofluoric acids, and coolant water (ethylene glycol).

Since the gasket 1 deals with various sealing objects as stated above, the adhesive 3 also is required to be resistant to these sealing objects. Further, the gasket has to have durability for a very long time, and the adhesive 3 is similarly required to have long-lasting durable strength.

The above-stated fuel cell constituting component can be manufactured, for example, by spraying the adhesive 3 for application or by applying the adhesive 3 using a dispenser to the part of the attachment member 5 to form the gasket 1 thereon and vulcanization-forming the gasket 1 on the adhesive 3.

The above-stated configuration is just an example, which is not a limiting one.

The thus configured fuel cell constituting component has the following advantages.

As illustrated in FIG. 2A, in the adhesive non-application region W2, the attachment member 5 is provided with the protrusion 7 along a seal line of the gasket 1, and the adhesive 3 is applied at a portion other than the protrusion 7, where rubber is integrally formed by injection molding.

At this time, an adhesive 3a on the stack inside A may be influenced by the sealing objects. Whereas, an adhesive 3b on the stack outside B is not influenced by the sealing objects because it is sealed by a seal surface pressure generated at the protrusion 7 and the bottom surface of the gasket 1.

Further, the protrusion 7 is provided at the center potion of the gasket formation surface and the adhesive 3 is applied at both sides thereof, thus preventing the adhesive 3 flowing toward the center portion, leading to an advantage of improving reliability of the seal at the rear face (adhesion surface) of the gasket 1.

Figure 2B:
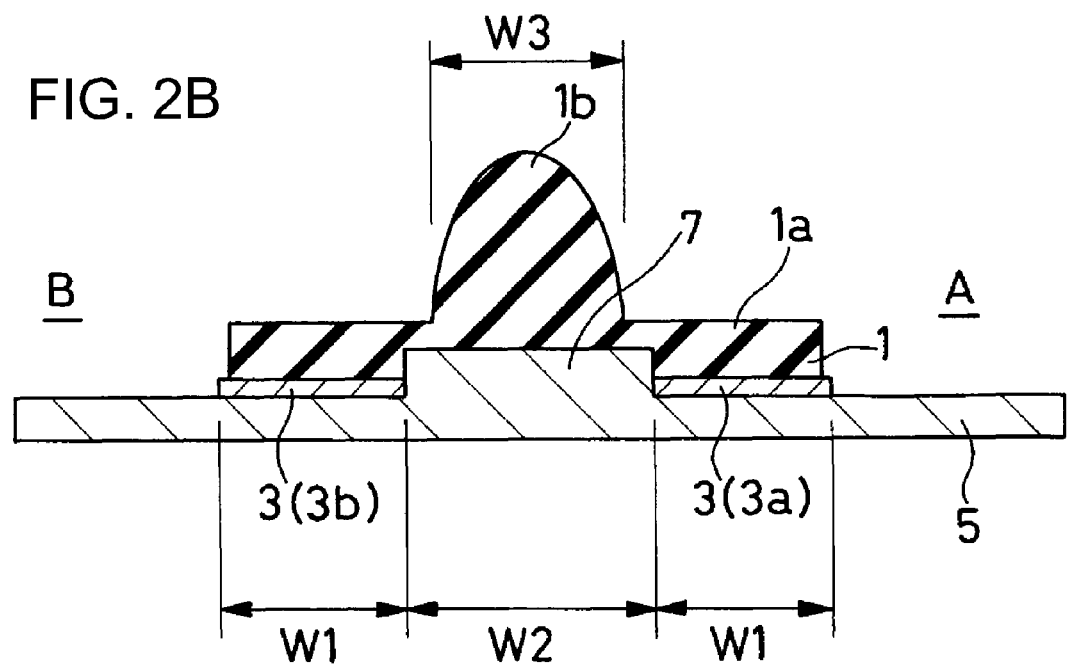
FIG. 2B is a cross-sectional view illustrating the same parts with an increased width of an adhesive non-application region.

Moreover, as illustrated in FIG. 2B, the width of the adhesive non-application region W2 is configured to be more than the width W3 where the seal surface pressure occurs at the bottom surface of the gasket 1 during compression, thus further preventing deterioration in attachability.

That is to say, the width of the adhesive non-application region W2 is made more than the width W3 where the seal surface pressure occurs at the bottom surface of the gasket 1 during compression, thus further preventing deterioration in attachability due to a phenomenon as in FIG. 6 that illustrates a state where the adhesion interface undergoes a shearing force due to elastic deformation of the gasket 1.

With the above-stated configuration, long-lasting durable strength of the adhesive 3 can be expected.

Embodiment 3

Figure 3A:
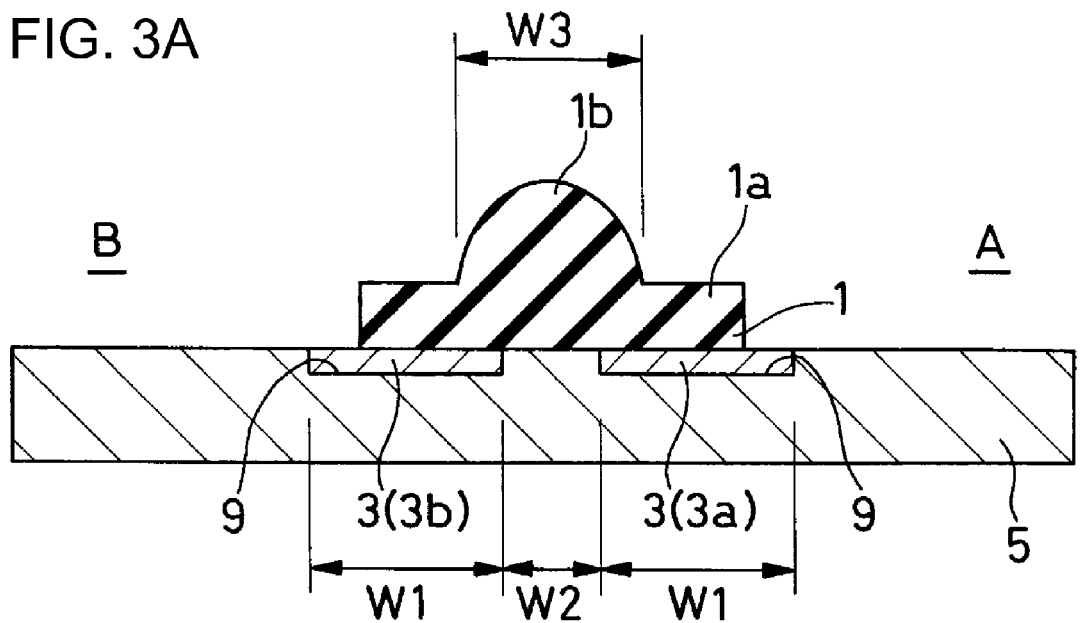
FIG. 3A is a cross-sectional view illustrating major parts of a fuel cell constituting component according to Embodiment 3 of the present disclosure.

As illustrated FIG. 3A, a fuel cell constituting component of the present embodiment is obtained by integrating a gasket 1 and an attachment member 5 using an adhesive 3.

Both side portions of a formation surface for the gasket 1 of the attachment member 5 in the width direction of the gasket are provided with adhesive application regions W1 where the adhesive 3 is interposed, and a center portion in the width direction of the gasket is provided with an adhesive non-application region W2 where the adhesive 3 is not interposed.

Then, in the adhesive application region W1, the attachment member 5 is provided with a groove portion 9, in which the adhesive 3 is filled.

The attachment member 5 in the above-stated embodiment may be a separator, for example, that is a sheet-shaped member playing a role to block gas and air. A material thereof may be carbon, metal, resin or the like.

The gasket 1 is provided in an endless manner along a perimeter portion on a flat surface of a plate, for example, having a cross-section including an inverted U-shaped sealing lip 1b integrally formed with a flat-shaped attachment portion 1a, and a material of the gasket 1 may be an elastic body in the form of rubber. The gasket 1 for fuel cell deals with various sealing objects such as hydrogen, oxygen, strong acids, hydrofluoric acids, and coolant water (ethylene glycol).

Since the gasket 1 deals with various sealing objects as stated above, the adhesive 3 also is required to be resistant to these sealing objects. Further, the gasket has to have durability for a very long time, and the adhesive 3 is similarly required to have long-lasting durable strength.

The above-stated fuel cell constituting component can be manufactured, for example, by spraying the adhesive 3 for application or by applying the adhesive 3 using a dispenser to the part of the attachment member 5 to form the gasket 1 thereon and vulcanization-forming the gasket 1 on the adhesive 3.

The above-stated configuration is just an example, which is not a limiting one.

The thus configured fuel cell constituting component has the following advantages.

The center portion of the bottom surface of the gasket 1 is provided with the adhesive non-application region W2, which is not constrained by adhesion. Therefore a shearing force during compression can be alleviated, thus making it possible to prevent rupture of the gasket 1 from the bottom surface.

At this time, an adhesive 3a on the stack inside A may be influenced by the sealing objects. Whereas, an adhesive 3b on the stack outside B is not influenced by the sealing objects because it is sealed by a seal surface pressure at the bottom surface of the gasket 1.

Further, at both sides of the gasket formation surface, portions to accumulate the adhesive 3, i.e., the groove portions 9 are provided, into which the adhesive 3 is applied. Thereby, a stable adhesion application state can be obtained. Since the adhesive application region W1 is not continuous, diffusive deterioration can be prevented.

Figure 3B:
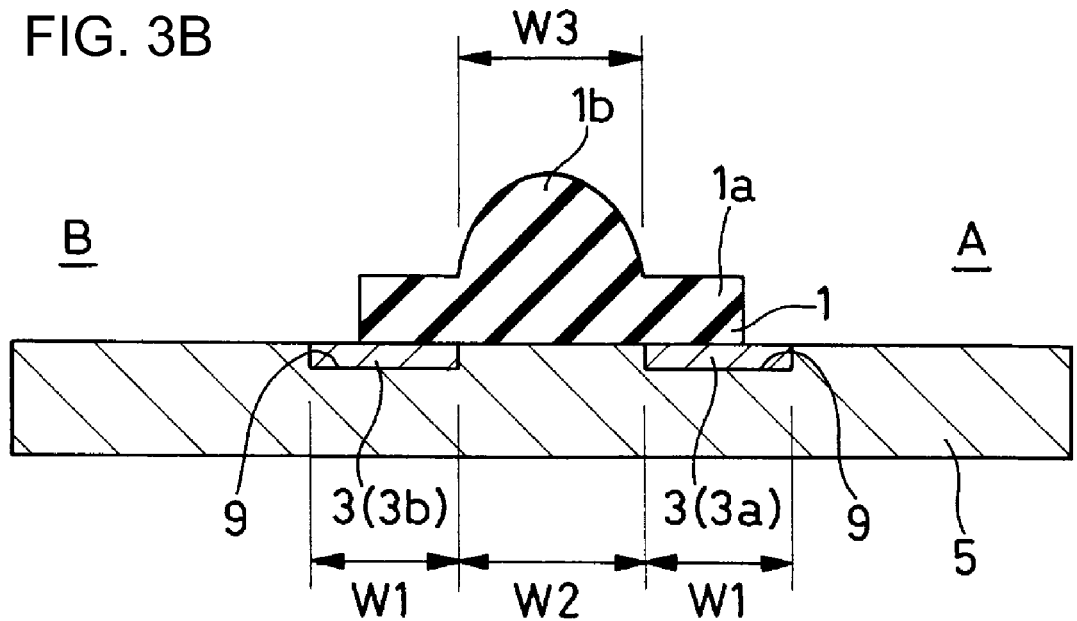
FIG. 3B is a cross-sectional view illustrating the same parts with an increased width of an adhesive non-application region.
Figure 4:
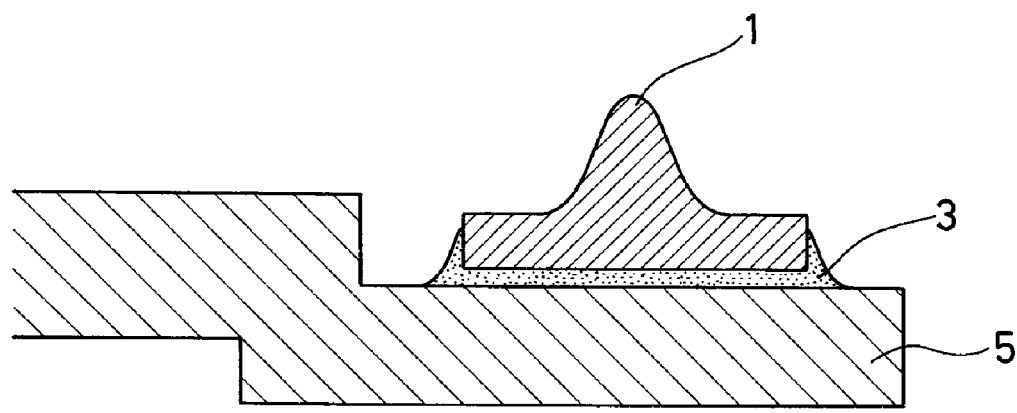
FIG. 4 is a cross-sectional view illustrating major parts of the fuel cell constituting component according to a prior art example.
Figure 5:
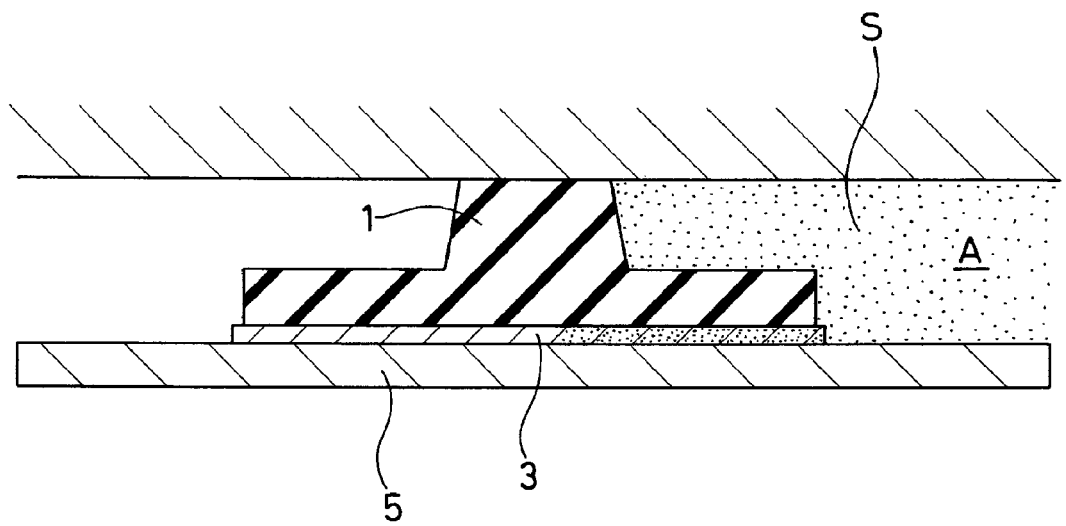
FIG. 5 illustrates a state where a malfunction occurs in the fuel cell constituting component according to the prior art example.

Moreover, as illustrated in FIG. 3B, the width of the adhesive non-application region W2 is configured to be more than the width W3 where the seal surface pressure occurs at the bottom surface of the gasket during compression, thus further preventing deterioration in attachability.

That is to say, the width of the adhesive non-application region W2 is made more than the width W3 where the seal surface pressure occurs at the bottom surface of the gasket 1 during compression, thus further preventing deterioration in attachability due to a phenomenon as in FIG. 6 that illustrates a state where the adhesion interface undergoes a shearing force due to elastic deformation of the gasket.

With the above-stated configuration, long-lasting durable strength of the adhesive can be expected.

DESCRIPTION OF SYMBOLS

1 GASKET
1A ATTACHMENT PORTION
1B SEALING LIP
3 ADHESIVE
3A ADHESIVE ON A STACK INSIDE
3B ADHESIVE ON A STACK OUTSIDE
5 ATTACHMENT MEMBER
7 PROTRUSION
9 GROOVE PORTION
A STACK INSIDE
B STACK OUTSIDE
W1 ADHESIVE APPLICATION REGION
W2 ADHESIVE NON-APPLICATION REGION
W3 WIDTH WHERE A SEAL SURFACE PRESSURE OCCURS

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A fuel cell constituting component obtained by integrating an attachment member and a gasket by using an adhesive, wherein an entirety of both side portions of a gasket formation surface of the attachment member in the width direction of the gasket are provided with adhesive application regions where the adhesive is interposed, a gasket center portion along a width direction of the gasket formation surface, wherein an entirety of the center portion is provided with an adhesive non-application region where the adhesive is not interposed.

2. A fuel cell constituting component obtained by integrating an attachment member and a gasket by using an adhesive, wherein an entirety of both side portions of a gasket formation surface of the attachment member in the width direction of the gasket are provided with adhesive application regions where the adhesive is interposed, a gasket center portion along a width direction of the gasket formation surface, wherein an entirety of the center portion is provided with an adhesive non-application region where the adhesive is not interposed, and wherein in the adhesive non-application region, the attachment member is provided with a protrusion.

3. A fuel cell constituting component obtained by integrating an attachment member and a gasket by using an adhesive, wherein an entirety of both side portions of a gasket formation surface of the attachment member in the width direction of the gasket are provided with adhesive application regions where the adhesive is interposed, a gasket center portion along a width direction of the gasket formation surface, wherein an entirety of the center portion is provided with an adhesive non-application region where the adhesive is not interposed, and wherein in the adhesive application regions, the attachment member is provided with a groove portion, in which the adhesive is filled.

* * * * *